United States Patent
Waltermann et al.

(10) Patent No.: US 7,818,553 B2
(45) Date of Patent: *Oct. 19, 2010

(54) METHOD AND APPARATUS FOR PREVENTING UNAUTHORIZED MODIFICATIONS TO RENTAL COMPUTER SYSTEMS

(75) Inventors: Rod D. Waltermann, Rougemont, NC (US); Daryl Cromer, Cary, NC (US); Howard J. Locker, Cary, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 877 days.

This patent is subject to a terminal disclaimer.

(21) Appl. No.: 11/535,538

(22) Filed: Sep. 27, 2006

(65) Prior Publication Data

US 2008/0077785 A1 Mar. 27, 2008

(51) Int. Cl.
*G06F 15/177* (2006.01)
*G06F 9/00* (2006.01)
(52) U.S. Cl. ..................... 713/1; 713/2; 705/1
(58) Field of Classification Search ............ 713/1, 713/2; 705/1
See application file for complete search history.

(56) References Cited

U.S. PATENT DOCUMENTS

| 6,618,810 B1 * | 9/2003 | Dirie ........................ 726/27 |
|---|---|---|
| 6,772,361 B1 * | 8/2004 | Walsh ........................ 713/502 |
| 2003/0014508 A1 * | 1/2003 | Cheston et al. ............ 709/223 |
| 2003/0041184 A1 * | 2/2003 | Tervo ........................ 710/1 |
| 2003/0084380 A1 * | 5/2003 | Piazza et al. ............. 714/47 |
| 2004/0008582 A1 * | 1/2004 | Richards et al. .......... 368/10 |
| 2005/0038757 A1 * | 2/2005 | Wada ........................ 705/400 |
| 2005/0044191 A1 * | 2/2005 | Kamada et al. ........... 709/223 |
| 2005/0044203 A1 * | 2/2005 | Kokubun et al. .......... 709/223 |
| 2005/0102237 A1 * | 5/2005 | Wakimoto .................. 705/59 |
| 2007/0244708 A1 * | 10/2007 | Locker et al. ............... 705/1 |
| 2008/0077420 A1 * | 3/2008 | Cromer et al. ............. 705/1 |

\* cited by examiner

*Primary Examiner*—Vincent T Tran
(74) *Attorney, Agent, or Firm*—Antony P. Ng; Dillon & Yudell LLP

(57) ABSTRACT

A method for preventing unauthorized modifications to a rental computer system is disclosed. During boot up of the rental computer system, a determination is made whether or not a time-day card is bound to the rental computer system. If the time-day card is bound to the rental computer system, another determination is made whether or not a time/date value on the time-day card is less than a secure time/date value stored in a secure storage location during the most recent power down. If the time/date value on the time-day card is not less than the secure time/date value, yet another determination is made whether or not the secure time/date value is less than an end time/date rental value. If the secure time/date value is less than the end time/date rental value, the rental computer system continues to boot.

14 Claims, 4 Drawing Sheets

METHOD AND APPARATUS FOR PREVENTING UNAUTHORIZED MODIFICATIONS TO RENTAL COMPUTER SYSTEMS

BACKGROUND OF THE INVENTION

1. Technical Field

The present invention relates to computer rentals in general, and, in particular, to a method and apparatus for handling rental computer systems. Still more particularly, the present invention relates to a method and apparatus for preventing unauthorized modifications to rental computer systems.

2. Description of Related Art

When dealing with computers, some companies (or users) prefer leasing or renting over purchasing. The lease term of a computer lease typically lasts from two to four years. On the other hand, a company can rent a computer on a monthly basis or on a per usage basis. Thus, the decision of whether to lease or to rent computers tends to depend on the length of time a company plans to keep its lease/rental computers.

From a user standpoint, one problem associated with computer leasing is to make sure all lease computers are returned at the end of a computer lease; otherwise, the user must continue to pay at the lease rate for any lease computers that have not been returned. From a rental company standpoint, one problem associated with computer rental is to prevent renters from performing unauthorized modifications to rental computers such that the renters can still use their rental computers while without paying the required rental fees.

The present disclosure provides a method and apparatus for preventing unauthorized modifications to rental computers such that it would not be practical and/or cost effective to modify rental computers simply to avoid paying the required rental fees.

SUMMARY OF THE INVENTION

In accordance with a preferred embodiment of the present invention, during boot up of a rental computer system, a determination is made whether or not a time-day card is bound to the rental computer system. If the time-day card is bound to the rental computer system, another determination is made whether or not a time/date value on the time-day card is less than a secure time/date value stored in a secure storage location during the most recent power down. If the time/date value on the time-day card is not less than the secure time/date value, yet another determination is made whether or not the secure time/date value is less than an end time/date rental value. If the secure time/date value is less than the end time/date rental value, the rental computer system continues to boot.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
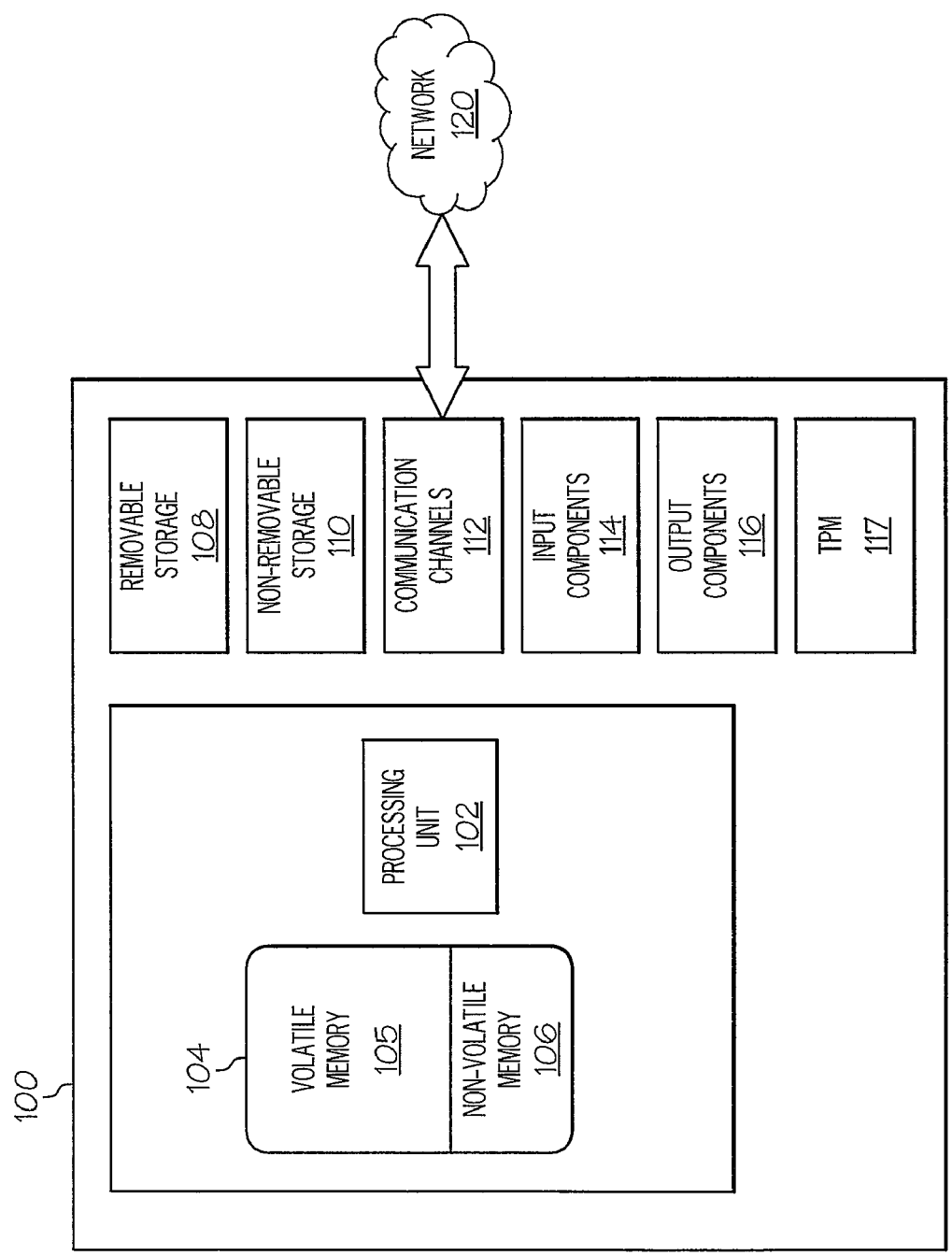
FIG. 1 is a block diagram of a rental computer system in which a preferred embodiment of the present invention is incorporated.

Referring now to the drawings and in particular to FIG. 1, there is depicted a block diagram of a rental computer system in which a preferred embodiment of the present invention is incorporated. As shown, a rental computer system 100 includes a processing unit 102 and a memory 104. Memory 104 includes a volatile memory 105 (such as a random access memory) and a non-volatile memory 106 (such as a read-only memory). Rental computer system 100 also contains removable storage media devices 108, such as compact discs, optical disks, magnetic tapes, etc., and non-removable storage devices 110, such as hard drives. In addition, rental computer system 100 may contain communication channels 112 for providing communications with other systems on a computer network 120. Rental computer system 100 may also have input components 114 such as a keyboard, mouse, etc., and output components 116 such as displays, speakers, printers, etc.

A Trusted Platform Module (TPM) 117 is included within rental computer system 100 to provide secure generations of cryptographic keys, and limits the use of those keys to signing/verification or encryption/decryption, as it is known to those skilled in the art. TPM 117 can be utilized to ensure that data being used to grant access to the operating system of rental computer system 100 is maintained securely.

Figure 2:
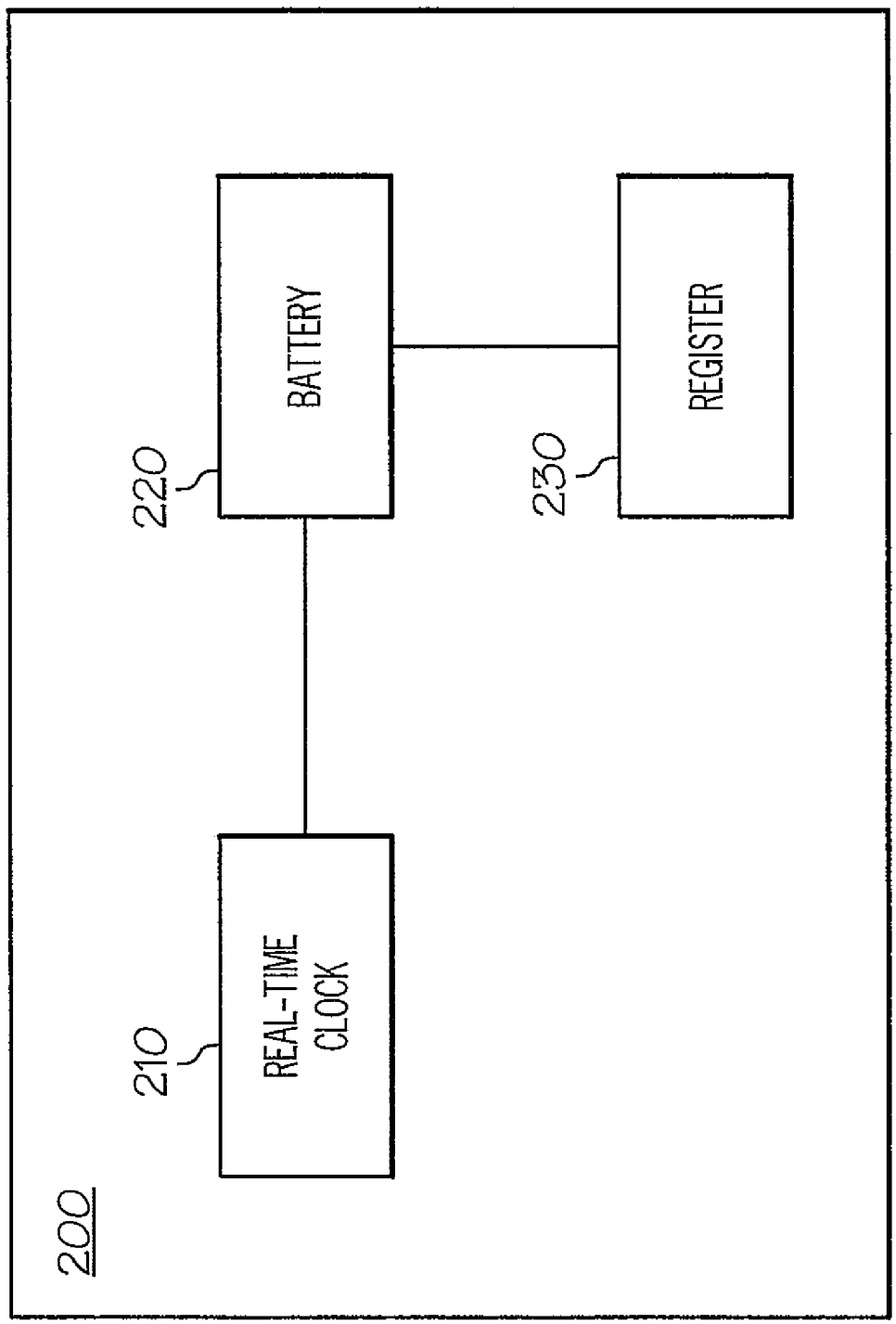
FIG. 2 is a block diagram of an apparatus for preventing unauthorized modifications to rental computer systems, in accordance with a preferred embodiment of the present invention.

With reference now to FIG. 2, there is depicted a block diagram of an apparatus for preventing unauthorized modifications to rental computer systems, in accordance with a preferred embodiment of the present invention. As shown, a time-day card 200 includes a real-time clock 210 and a battery 220. Time-day card 210 also includes a register 230 and a counter 240. Register 230 is used to indicate whether or not battery 220 has been removed and/or drained of its power. For example, a bit within register 230 can be locked in response to battery 220 being removed or the power of battery 220 has all been drained. Preferably, time-day card 210 is to be inserted into one of the memory sockets, such as SIMM or DIMM memory sockets, on a motherboard of a rental computer system, such as rental computer system 100 from FIG. 1. Real time clock 210 can be then accessed via a bus connected to the rental computer system. The time and day of time-day card 210 are initially set during the manufacturing of the rental computer system.

Figure 3:
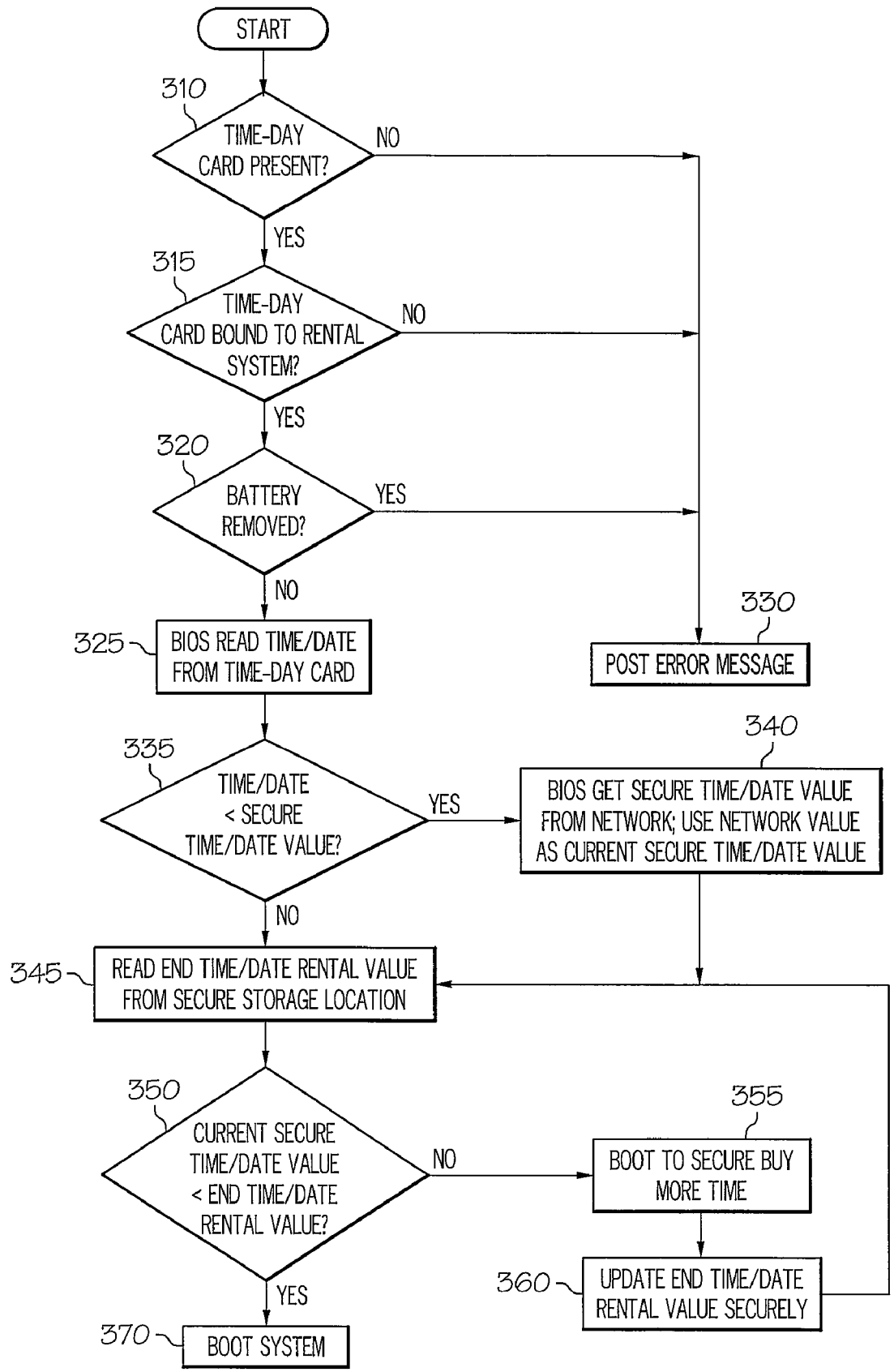
FIG. 3 is a high-level logic flow diagram of a method for setting secure time/day to prevent unauthorized modifications to rental computer systems, in accordance with a preferred embodiment of the present invention.

Referring now to FIG. 3, there is illustrated a high-level logic flow diagram of a method for setting secure time/day value to prevent unauthorized modifications to rental computer systems, in accordance with a preferred embodiment of the present invention. During power-on self test (POST), the basic input/output system (BIOS) determines whether or a time-day card, such as time-day card 210 from FIG. 2, is present in a rental computer system, as shown in block 310. This is accomplished by checking a counter chip that has registers for containing certain addresses with the correct information that is bound to the BIOS at time of manufacturing; thus, the time-day card is only valid in one rental computer system. In other words, the time-day card cannot be moved from one rental computer system to another.

If the time-day card is present, then another determination is made as to whether or not the time-day card is bound to the rental computer system, as depicted in block 315. The binding is a simple private/public key using a TPM. If the time-day card is removed from the rental computer system, the BIOS will not boot, thereby making the rental computer system inoperatable. If the time-day card is bound to the rental computer system, another determination is made as to whether a battery on the time-day card has been removed, as shown in block 320. If the battery on the time-day card has not been removed, the BIOS reads the time/date information from the real-time clock of the time-day card, as depicted in block 325.

If the time-day card is not present, or if the time-day card is not bound to the rental computer system, or if the battery on the time-day card has been removed or drained of its power, the POST stops to display an error message, and the rental computer system will not continue to boot, as shown in block 330.

The time/date information from the real-time clock of the time-day card are compared to a current secure time/date value stored in a secure storage location during last power down (or manufacturing value if first power on). A determination is made as to whether or not the time/date information from the real-time clock is less than the current secure time/date value, as depicted in block 335. If the time/day information is less than the current secure time/date value, then the BIOS obtains a new secure time/date value from a network, and the new secure time/date value from the network becomes the current secure time/date value, as shown in block 340, and the process proceeds to block 345. If the time/day information is not less than the current secure time/date value, then the end of time/date rental value is securely read from a secure storage location, as depicted in block 345.

Next, a determination is made as to whether or not the current secure time/date value is less than the end time/date rental value, as shown in block 350. If the current secure time/date value is not less than the end time/date rental value, the renter is prompted to buy more rental time on the rental computer (via a secure buy routine from BIOS), as depicted in block 355. After more rental time has been purchased by the renter, the end time/date rental value stored in the secure storage location is updated securely, as shown in block 360, and the process proceeds to block 345.

Otherwise, if the secure time/date value is less than the end time/date rental value, the rental computer system continues to boot, as shown in block 370.

Figure 4:
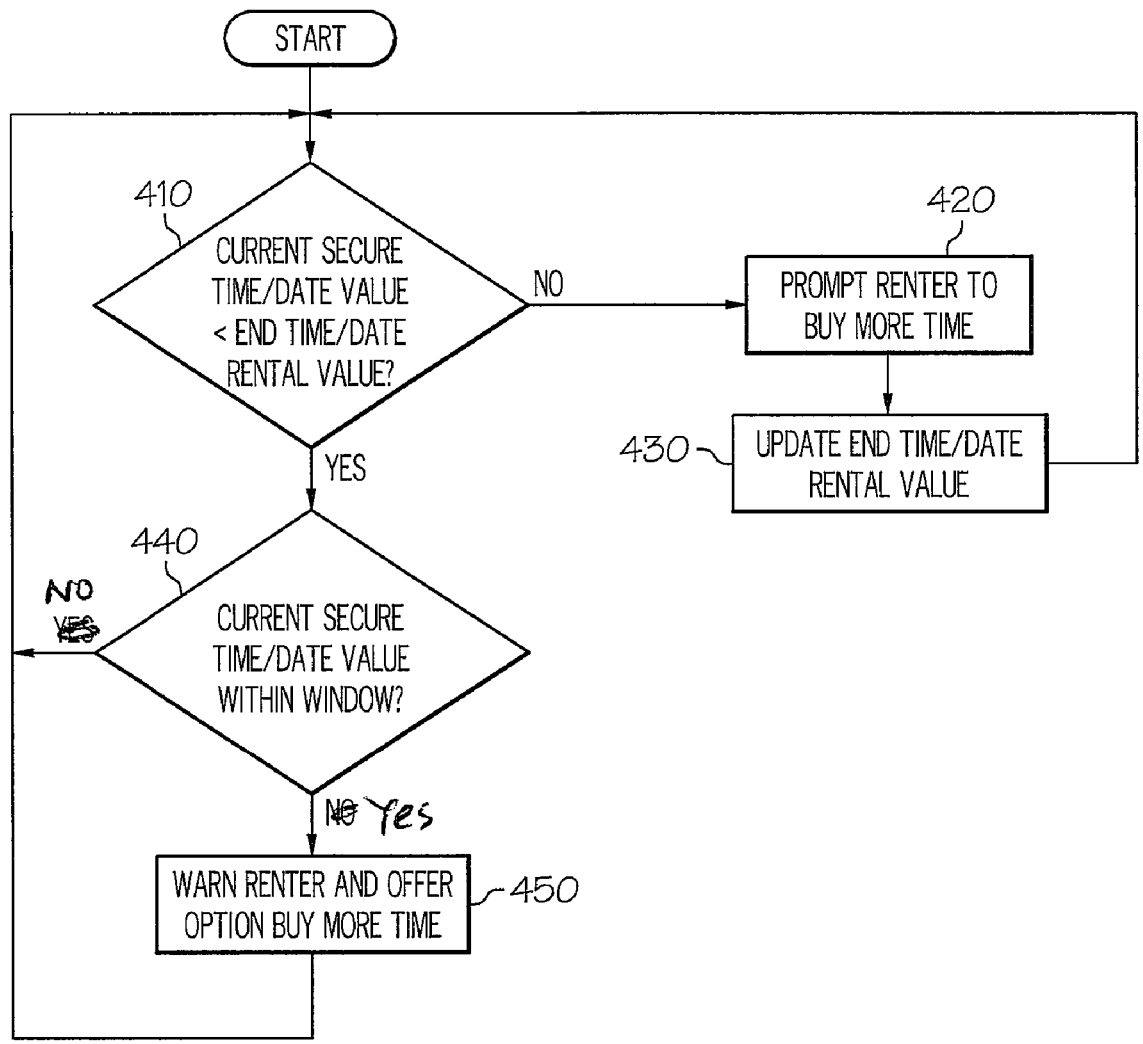
FIG. 4 is a high-level logic flow diagram of a method for preventing unauthorized modifications to rental computer systems, in accordance with a preferred embodiment of the present invention.

With reference now to FIG. 4, there is illustrated a high-level logic flow diagram of a method for preventing unauthorized modifications to rental computer systems, in accordance with a preferred embodiment of the present invention. Since SMI BIOS is always running every x units of time, the SMI BIOS can be utilized to determine if the current secure time/date value is less than the end time/date rental value on a regular basis, as shown in block 410. If the current secure time/date value is not less than the end time/date rental value, the renter is prompted to buy more rental time on the rental computer, as depicted in block 420. After more rental time has been purchased by the renter, the end time/date value is updated securely, as shown in block 430, and the process returns to block 410.

If the current secure time/date value is less than the end time/date rental value, another determination is made as to whether or not the current secure time/date value falls within a window of the end time/date value, as shown in block 440. The size of the window is policy driven. For example, the window can be three days from the end time/date value. If the current secure time/date value falls within the window, the renter is warned more rental needs to be purchased soon and the renter is offered an option to purchase more rental time, as depicted in block 450. If the current secure time/date value does not fall within the window, the process returns to block 410.

As has been described, the present invention provides a method and apparatus for preventing unauthorized modifications to rental computer systems. The present invention uses a time-day card and a secure BIOS to prevent any unauthorized tampering to a rental computer system. With the time-day card, it is impossible for a renter to modify the date on a rental computer system. As such, a renter cannot fake the amount of usage time remaining on a rental computer system.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for preventing unauthorized modifications to a rental computer system, said method comprising:
   during boot up of a rental computer system,
      determining whether or not a time-day card is bound to said rental computer system;
      in response to a determination that said time-day card is bound to said rental computer system, determining whether or not a time/date value on said time-day card is less than a current secure time/date value;
      in response to a determination that said time/date value on said time-day card is not less than said current secure time/date value, determining whether or not said current secure time/date value is less than an end time/date rental value; and
      in response to a determination that said current secure time/date value is less than said end time/date rental value, continue booting of said rental computer system.

2. The method of claim 1, wherein said method further includes in response to a determination that said time-day card is not bound to said rental computer system, stopping said booting of said computer system.

3. The method of claim 1, wherein said method further includes in response to a determination that said time/date value on said time-day card is less than said current secure time/date value, obtaining a new secure time/date value from a network, and replacing said current secure time/date value with said new secure time/date value.

4. The method of claim 1, wherein said method further includes in response to a determination that said current secure time/date value is not less than said end time/date rental value, prompting a renter to purchase more rental time.

5. The method of claim 1, wherein said time-day card includes a real-time clock and a battery.

6. A computer non-transitory medium having a computer program product for preventing unauthorized modifications to a rental computer system, said computer non-transitory medium comprising:

during boot up of a rental computer system,
program code for determining whether or not a time-day card is bound to said rental computer system;
program code for, in response to a determination that said time-day card is bound to said rental computer system, determining whether or not a time/date value on said time-day card is less than a current secure time/date value;
program code for, in response to a determination that said time/date value on said time-day card is not less than said current secure time/date value, determining whether or not said current secure time/date value is less than an end time/date rental value; and
program code for, in response to a determination that said current secure time/date value is less than said end time/date rental value, continue booting of said rental computer system.

7. The computer non-transitory medium of claim 6, wherein said computer non-transitory medium further includes program code for, in response to a determination that said time-day card is not bound to said rental computer system, stopping said booting of said computer system.

8. The computer non-transitory medium of claim 7, wherein said computer non-transitory medium further includes program code for, in response to a determination that said time/date value on said time-day card is less than said current secure time/date value, obtaining a new secure time/date value from a network, and replacing said current secure time/date value with said new secure time/date value.

9. The computer non-transitory medium of claim 7, wherein said computer non-transitory medium further includes program code for, in response to a determination that said current secure time/date value is not less than said end time/date rental value, prompting a renter to purchase more rental time.

10. The computer non-transitory medium of claim 7, wherein said time-day card includes a real-time clock and a battery.

11. A rental computer system comprising:
a time-day card having a real-time clock and a battery; and
a processing unit for, during boot up of said rental computer system,
determining whether or not said time-day card is bound to said rental computer system;
in response to a determination that said time-day card is bound to said rental computer system, determining whether or not a time/date value on said time-day card is less than a current secure time/date value;
in response to a determination that said time/date value on said time-day card is not less than said current secure time/date value, determining whether or not said current secure time/date value is less than an end time/date rental value; and
in response to a determination that said current secure time/date value is less than said end time/date rental value, continue booting of said rental computer system.

12. The rental computer system of claim 11, wherein said processing unit stops said boot up of said computer system in response to a determination that said time-day card is not bound to said rental computer system, stopping said booting of said computer system.

13. The rental computer system of claim 11, wherein said processing unit utilizes a network time/date value as said current secure time/date value in response to a determination that said time/date value on said time-day card is less than said secure time/date value, obtaining a new secure time/date value from a network, and replacing said current secure time/date value with said new secure time/date value.

14. The rental computer system of claim 11, wherein said processing unit prompts a renter to purchase more rental time in response to a determination that said current secure time/date value is not less than said end time/date rental value, prompting a renter to purchase more rental time.

* * * * *